Dec. 14, 1965  H. REBESKI  3,222,990
METHOD OF SEPARATELY ROUGHING AND FINISHING BEVEL GEARS
Filed March 23, 1962  4 Sheets-Sheet 1
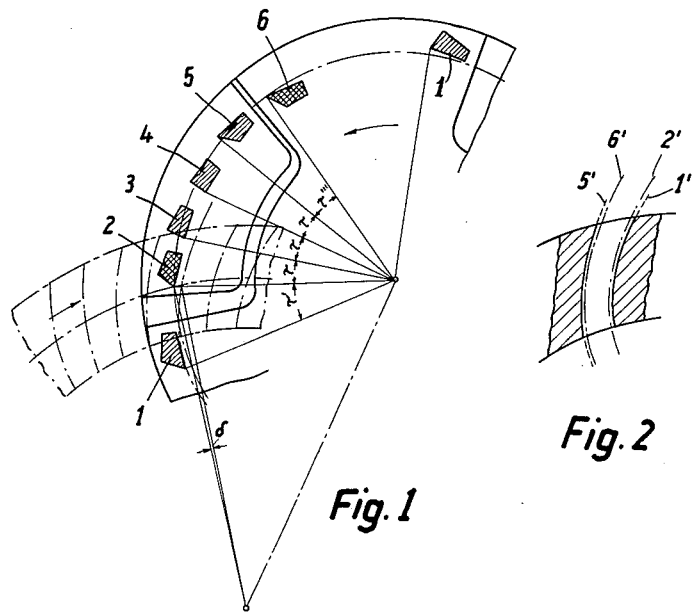
Fig. 1
Fig. 2
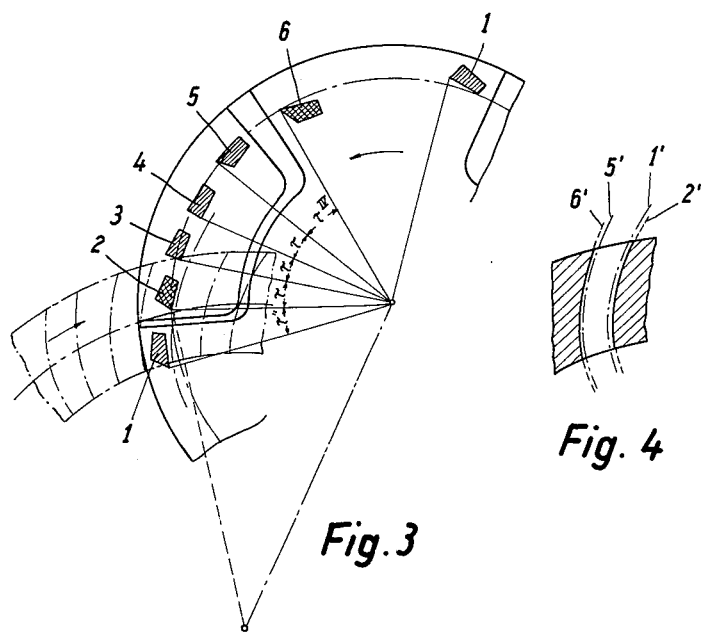
Fig. 3
Fig. 4
Inventor:
Hans Rebeski
By Inventor:
Hans Rebeski
by Dec. 14, 1965    H. REBESKI    3,222,990
METHOD OF SEPARATELY ROUGHING AND FINISHING BEVEL GEARS
Filed March 23, 1962    4 Sheets-Sheet 4
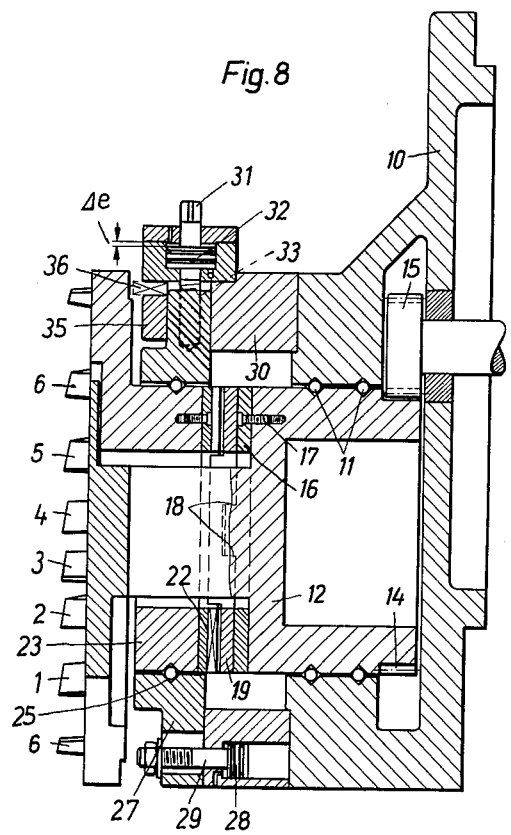
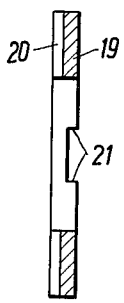
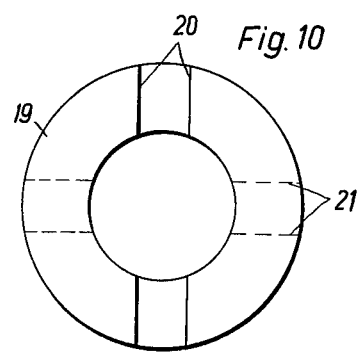
Inventor:
Hans Rebeski
by United States Patent Office 3,222,990
Patented Dec. 14, 1965

3,222,990
METHOD OF SEPARATELY ROUGHING AND FINISHING BEVEL GEARS
Hans Rebeski, Remscheid, Germany, assignor to W. Ferd. Klingelnberg Sohne, Huckeswagen, Rhineland, Germany
Filed Mar. 23, 1962, Ser. No. 182,023
Claims priority, application Germany, Mar. 25, 1961, K 43,306
9 Claims. (Cl. 90—5)

The present invention relates to a method of separately roughing and finishing bevel gears with cycloidal flank traces (Flankenlängslinien) with a cutter-head carrying roughing and finishing blades cutting successively. Good surfaces can be economically obtained by chip-removing operations, during which larger quantities of material have to be removed, only if the chip-removing operation is subdivided into a roughing and a finishing operation, and only if the finishing operation is effected by tools or tool portions which were not employed for the roughing operation. The above applies in particular to gear-cutting operations. With gear-cutting operations, a change of tools, i.e., the employment of separate roughing and finishing tools, is generally contemplated only in connection with mass production, whereas when gears have to be custom-made or made individually, the gears are roughened and finished with the same tool in one cut. The machining data will, of course, have to be so selected that the cutting edges of the tools will not prematurely lose their required shape and sharpness for producing a precise flank shape. Therefore, the tools can, for roughing purposes, not be employed to the limit of their economic ability. This drawback can be overcome by equipping the tools with two groups of cutting-teeth so that one of these two groups is employed for roughing, whereas the other group of cutting-teeth is employed for finishing only. Such an arrangement, which has been used heretofore, can, however, not be employed in every instance but requires certain pre-requisites which have to be met with regard to the tooth-cutting method and with regard to the tools employed in connection therewith.

It is an object of the present invention to provide a method of separately roughing and finishing bevel gears with cycloidal flank traces according to which the same cutter-head is employed for roughing and finishing without affecting the precision of the finishing operation.

It is another object of this invention to provide a method as set forth in the preceding paragraph, which will make it possible to fully exploit the performance ability of the cutter-head without affecting the finishing precision and without time loss for any changing of tools.

These and other objects and advantages of the invention will appear more clearly from the following specification in connection with the accompanying drawings, in which:

FIGURE 1 illustrates a cutter-head with a blade arrangement for carrying out the method according to the invention, said cutter-head occupying its roughing position.

FIGURE 2 illustrates the path of the inner and outer blades in a tooth space in the crown wheel pitch plane with the cutter head according to FIG. 1, in its roughing position.

FIGURE 3 illustrates the cutter-head of FIG. 1 in its finishing position.

FIGURE 4 shows the cutter paths in the finishing position of the cutter-head according to FIGURE 3.

FIGURE 8 is a sectional view indicated by line A—A on FIGURE 7.

FIGURES 9 and 10 are sectional and plan views, respectively, of the coupling disc of FIGURE 8.

Figure 5:
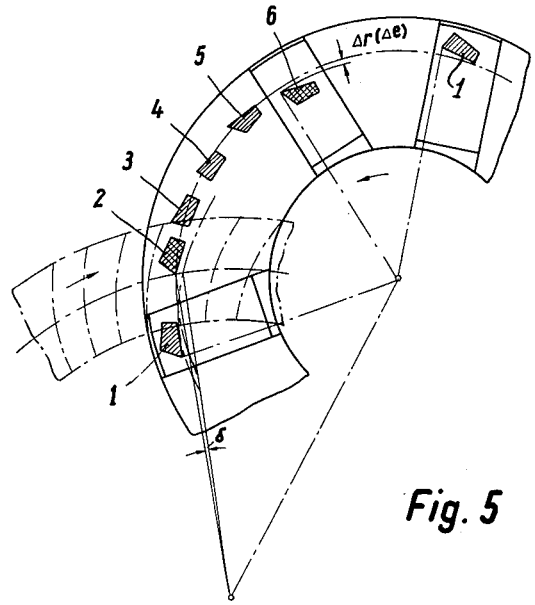
FIGURE 5 illustrates a cutter-head with a blade arrangement for carrying out the method according to the invention in roughing position.

As mentioned above, the present invention is concerned with a method for separately roughing and finishing bevel gears with cycloidal flank traces by the same cutter-head which is provided with roughing and finishing blades which subsequently machine the work piece to be formed into a gear. Bevel gears with flank traces, in most instances of the epicycloidal form, are produced on machines with cutter-heads having end blades and having one or more groups of blades, while each blade group comprises at least one inner cutter for forming the convex flanks of the gear teeth, and comprising at least an outer cutter for cutting the hollow concave flanks. In addition thereto, the blades group may comprise one or more pre-cutting or intermediate blades. The cutter-head and the wheel to be cut into a gear rotate while engaging each other at the ratio of the tooth number of the wheel to the number of the blade groups (so-called number of gears) of the cutter-head. In this connection, all blades of one group always pass through the same tooth space of the work piece gear. The cutter-head, which is eccentrically mounted on the face plate of the machine, in this way represents a generatrix face wheel with epicycloidal flank traces which is rotatable about its axis (face plate axis), while said work piece gear is engaged by and rotates with said generatrix face wheel. The profile of the height of the tooth is formed by the generating movement superimposed upon the said continuous mesh rotation.

According to another heretofore known machine, a cutter-head is employed which is composed of two parts. These parts rotate at the same speed about two slightly spaced parallel axes. One of the two parts carries the inner cutter whereas the other part carries the outer cutter. In this machine, the two cutter-head parts are rotatable relative to each other, and the distance between the two axes of rotation is adjustable within certain limits.

When the cutter blades in the cutter-head or in the cutter-head parts follow each other in uniformly spaced arrangement, the wheel into which the teeth have to be cut will always rotate by the same angle from one passage of a blade through the work piece to the next passage of the blade through the work piece. For example, such angle would amount to half the pitch angle (tooth space angle) if one group would consist of one inner blade and one outer blade and the other group would consist of outer blades only. If the cutting edges of the blades were all located on the same sweep radius, and if, furthermore, with a machine having a divided cutter-head, the eccentricity 0 were selected, a gear would be cut with a tooth space width=tooth thickness=half pitch. If, however, the angular distance between the two knives of the group were increased or decreased with regard to a uniform pitch, the succeeding blade will enter the tooth space somewhat later or earlier, i.e., when the gear has rotated farther or less farther. The tooth space would then be cut somewhat wider or narrower, respectively. With uniformly spaced blades, a wider or narrower tooth space is obtained when the sweep radii of the inner and outer diameter are selected of different size or with a divided cutter-head, also with the same sweep radii when an eccentricity is selected. With different large sweep radii of the blades, the flanks will naturally be curved differently, which factor is utilized by selecting the larger radius for the outer cutter for producing the relative longitudinal crowning of the convex and concave flanks.

In order to be able, on a machine of the above-mentioned type, by means of the same cutter-head, to roughen and finish the gears without employing the finishing blades during the roughing operation and without employing the roughing blades during the finishing operation, the present invention has provided the following arrangement. In conformity with the present invention, the inner and outer finishing blades are, in their roughing position, arranged angularly spaced from the preceding roughing blades and are arranged on sweep radii in which they will not become effective for cutting. The said inner and outer finishing blades are respectively, in cooperation with a relative rotation of the work piece gear with regard to the cutter-head, brought into finishing position for carrying out a cut while, simultaneously, the roughing blade is moved out of its cutting position. This may be effected by:

(a) A small reduction or increase in the angular distance from the preceding roughing blades, or (b) By an increase in the sweep radius of the outer finishing and the inner roughing blade, or (c) When a machine with divided cutter-head is employed, by an increase in the eccentricity of the outer finishing and the inner roughing blade.

Referring now to the drawings in detail, FIG. 1 diagrammatically illustrates a portion of a cutter-head with an arrangement of the blades for practicing the method set forth above under (a) in roughing position, whereas FIG. 3 illustrates the same cutter-head in finishing position. The blades are cut at the level of the pitch plane. A blade group comprises the blades 1 to 6. The reference numeral 1 designates an inside cutting roughing blade, while the reference numeral 2 designates an inside cutting finishing blade. There are furthermore provided two central cutter blades 3 and 4, an outside cutting roughing blade 5 and an outside cutting finishing blade 6. For purposes of better differentiation, the roughing blades are hatched by ordinary hatching lines, whereas the finishing blades are cross-hatched. The leading inside roughing blade 1 sweeps a larger diameter circle than the finishing blade 2 following the latter, whereas the outside cutting roughing blade 5 sweeps a larger circle than the finishing blade 6. In the roughing position (FIG. 1) the angular distance $\tau'$ between the roughing blade 1 and finishing blade 2 is greater than the angular distance $\tau$ between the remaining blades of the group. This angular distance and the difference in the sweeping radii of blades 1 and 2, and 4 and 5 is so selected that with this blade position, the epicycloidal paths 2' and 6' of the cutting edges of the finishing blades extend, as diagrammatically illustrated in FIG. 2, seen from the center of the tooth space, within the path of the roughing blades 1' and 5'. Thus, only roughing blades are effective for the cut.

FIGURES 7 to 10 diagrammatically illustrate in plan view and in section a cutter head of the type shown in U.S. Patent 2,881,665 with an arrangement for changing the eccentricity when changing from roughing to finishing operation.

In a supporting body 10 connected to the non-illustrated face plate of the machine, there is journalled a cutter head member 12 which carries the blades 1 and 6 of the three provided blade groups. The reference numeral 13 designates a three-arm head plate carrying the blades 1 and 6. The member 12 is provided with teeth 14 meshing with the pinion 15. Connected to member 12 by means of screws 17 is a coupling disc 16 which one the inner side thereof has a rectangular strip 18.

A second loose coupling disc 19 (FIGURES 9, 10) is on both sides thereof provided with one groove 20, 21 each extending at right angles to each other. One groove is engaged by strip 18 of the fixed coupling disc 16, whereas the other groove is engaged by a similar strip on a third coupling disc 22. The coupling disc 22 is screwed to an annular second cutter head part 23 which is provided with three protrusions 24 extending between the arms of plate 13.

Arranged on protrusions 24 are cutters 2 to 5 of the three cutter groups. The cutter head part 23 is journalled on an anti-friction bearing 25 in the ring 27 which is held by means of six screw bolts 29 ending in small oil pistons 28 to a ring 30 connected to a supporting body 10. Screwed into ring 30 is a screw bolt 33 provided with a square head 31 at the outer end and formed between its ends as oil piston 32. Oil piston 32 is arranged in a pressure cylinder 34 which is connected to a ring 27, said piston 32 being adapted to carry out a small stroke $\Delta_e$ in cylinder 34. Screwed to ring 30 is an abutment block 35. Between said block and cylinder 34 an end measure 36 may be interposed for adjusting the individual eccentricity.

The coupling of the two cutter head members through the intervention of the cross grooved disc 19 permits an eccentric displacement of part 23 relative to parts 12, 13 without affecting the precision of the angle transfer to the cutter head member 23 which is initiated by the rotation through the intervention of the teeth 14 of cutter head member 12.

In roughing and smoothing position, the oil pistons 28 acted upon on the left-hand side by oil under pressure fixedly connect ring 27 with ring 30 and thus with the supporting body 10.

After completion of, for instance, the roughing operation, the pressure on pistons 28 is relieved and ring 27 which then will be freely displaceable, is moved radially for changing the eccentricity of the cutter head member 23. This displacement is effected by piston 32 which is operated by oil under pressure. The inward displacement equals the distance $\Delta_e$. In this way, in a manner described above, the finishing blades 2 and 6 will be made effective. Simultaneously therewith, the wheel to be provided with teeth will be rotated by the small angle $\delta$ for effecting a movement toward knife 6.

The initiation of the operations may be effected by an automatic control of the machine which, however, is not a part of the present invention.

The differences in radii and angles, which, in reality are only very small, have been shown in the drawing greatly enlarged, for purposes of clarity. After completion of the roughing operation which, for purposes of saving time, is preferably carried out with plunge feed, the cutter-head is moved into FIG. 3 position in which the angular distance between the blades 1 and 2 is decreased from $\tau'$ to $\tau''$, whereas the distance between the blades 5 and 6 is, over FIG. 1, increased from $\tau'''$ to $\tau^{IV}$. Inasmuch as now, between the passage of the roughing blade 1 through the work piece and the passage of the finishing blade 2 through the work piece, the work piece or work piece gear rotates only by a smaller angle than was the case during the roughing step, the path 2' of the finishing blade 2 will now, as diagrammatically illustrated in FIG. 4, extend outside path 1' of the roughing blade 1 when looking from the tooth space center, and the same applies in view of the enlarged angular distance, to the paths 6' and 5' of the finishing blade 6 and of the roughing blade 5. The transgression from the roughing position (FIG. 1) to the finishing position (FIG. 3) may be brought about either by moving the blades 1 and 6 toward the blades 2 to 5 in a direction counter to the direction of rotation of the blade head, or by moving the blades 2 to 5 in the direction of rotation of the cutter-head toward the blades 1 and 6. In the first-mentioned instance, the blades 2 to 5 will not change their path in the space cut during the roughing operation, and the finishing blade 2 would not cut at the convex flank. In order to effect such cut, the gear has to be moved by the small angle $\delta$ to such an extent toward the cutter-head that the blade cuts the finishing allowance off the tooth flank. The correctly radially adjusted finishing blade 6 will cut the finishing allowance off the other flank. In the second instance, when adjusting the blades 2 to 5, the finishing blade 6 would fail to cut, and in order to remove the finishing allowance, the gear would have to be turned by a corresponding angle δ toward the cutter-head in opposite direction.

The change in the blade position when changing over from roughing to finishing may be effected, for instance, by arranging the blades to be adjusted on a separate plate which is rotatable on the cutter-head body and which is rotated by a cam or the like. The turning of the wheel by the angle δ may be effected, for instance, without disturbing the automatic mechanism between cutter-head and wheel, through a differential transmission by means of an adjusting transmission provided for this very purpose.

The method according to the present invention may be carried out in a particularly simple manner on a machine according to U.S. Patent 2,881,665 which employs a cutter-head comprising two parts rotatable relative to each other.

With the modified method set forth above under (b) the blade sequence corresponds to that illustrated in FIGS. 1 and 3. However, in this instance, the relative displacement of the roughing and finishing blades is not effected by a change in the angular position of the blades but by a radial adjustment, i.e., by a change in the sweep radii.

Figure 6:
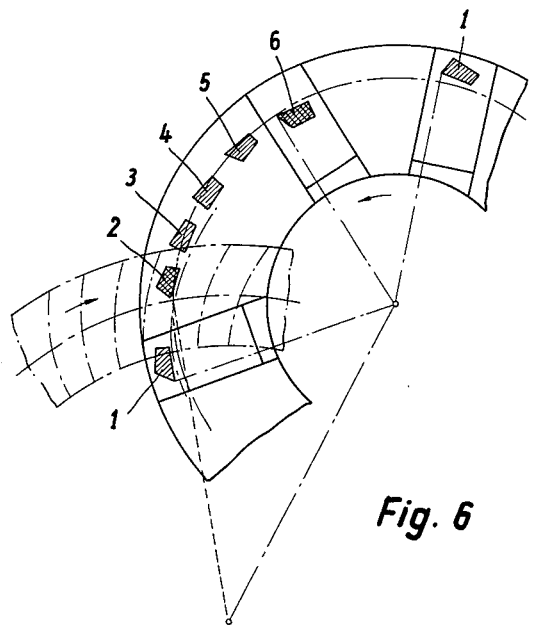
FIGURE 6 shows the same cutter-head as FIG. 5 but in finishing position.
Figure 7:
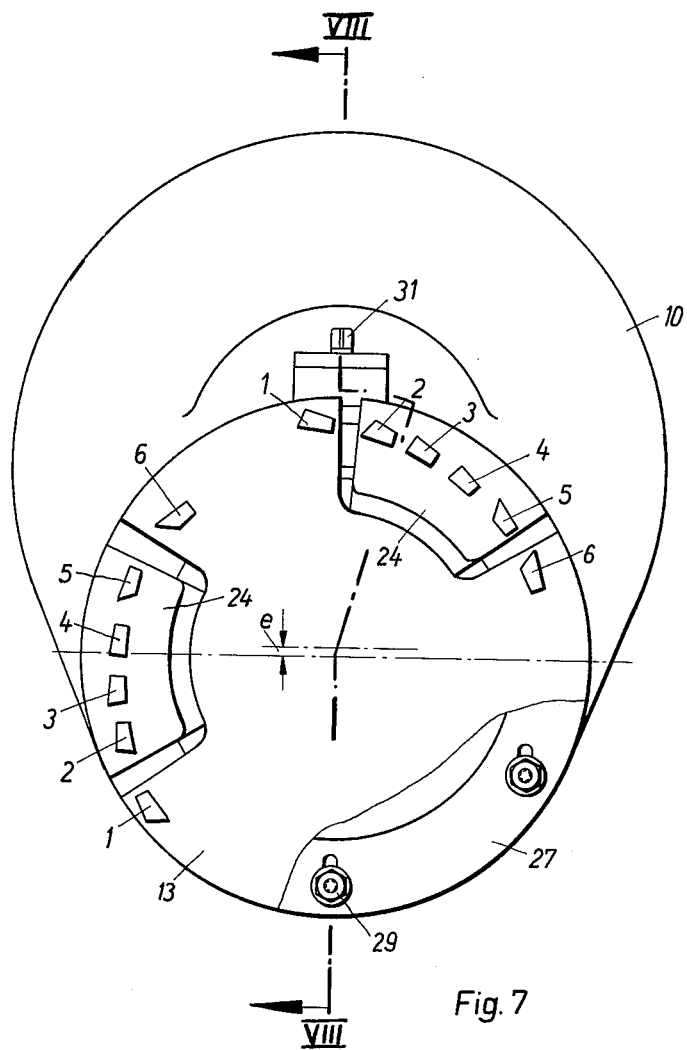
FIGURE 7 is a plan view of a cutter according to the present invention.

FIG. 5 illustrates the roughing arrangement, and FIG. 6 illustrates the finishing arrangement of the cutter-head. The individual blades are designated with the same reference numerals as in FIGS. 1 and 3, and FIGS. 2 and 4 analogously indicate the position of their paths in roughing and finishing position. In finishing position illustrated in FIG. 6, the roughing and finishing blades 1 and 6 are, over their roughing position of FIG. 5, displaced radially outwardly by the small distance $\Delta_r$. As a result thereof, the outer finishing blade 6 will become effective for the cut which, during the roughing operation, was idling in the shadow of the roughing blade 5. The inner finishing blade 2 has also in this instance to be brought to cut by turning the work piece gear by the slight angle δ toward the cutter-head until the finishing allowance has been cut off.

Instead of moving the blades 1 and 6 outwardly, it would also be possible to move the blades 2 to 5 inwardly, i.e., to decrease their sweeping radii. As a result thereof, the inside cutting finishing blade 2 would become effective for cutting, whereas the outside cutting finishing blade 6 will again, by turning the work wheel be employed for cutting off the finishing allowance.

For carrying out this method, a cutter-head is required in which those blades whose sweeping circle has to be changed when changing over from roughing to finishing, may be radially guided on the cutter-head body and may be displaced, for instance, by a cam disc. Furthermore, the above-mentioned transmission arrangement in the machine for turning the work wheel by the angle δ would be required.

With the modification mentioned above under (c) and to be practiced on a machine according to U.S. Patent 2,881,665, with a cutter-head composed of two parts and having its axes of rotation adjustable parallel to each other within a certain range, the displacement of the relative position of the cutter path in the meaning of FIGS. 2 and 4 is effected not by a change in the sweeping radii of the blades but by a change in the distance of their axes of rotation (eccentrically) by a small amount $\Delta_e$ (FIG. 5). FIG. 5 applies analogously to the blade sequence. Inside cutting roughing blade 1 and outside cutting finishing blade 6 are mounted on one cutter-head part, whereas the blades 2 to 5 are mounted on the other cutter-head part. By displacing the cutter-head part with blades 1 and 6 toward the outside (change in the eccentricity), the finishing blade which lagged behind the roughing blade 5 in the roughing position without effecting a cut, is then moved into cutting position. The inside finishing blade 2 will, also in this instance, again have to be brought into cutting position in the above-mentioned manner by turning the work wheel by an angle δ. When arranging blades 2 to 5 on the eccentrically adjustable cutter-head part, the procedure may also be changed in such a manner that during the roughing operations, these blades are adjusted to a certain eccentricity which is then changed for placing the knives into finishing position. This would have the same effect as a reduction in the sweeping radii in connection with the method of (b) supra.

In all three instances, the working position of the two finishing blades 2 and 6 is determined by the required tooth thickness and the relative longitudinal crowning of the flanks in conformity with the rules of the respective milling method. This also applies to the magnitude of the sweeping radii and also to the angular distances of the blades and the eccentricity to be adjusted in connection with a machine according to U.S. Patent 2,881,665.

In its three modifications, and with certain comparatively minor structural additions to the tools and machine equipment, which do not form a part of the present invention, the method according to the present invention permits full utilization of the working capacity of the cutter-head during the roughing of the gears, without affecting the finishing precision and without any loss in time by any exchange of tools when changing over from roughing to finishing, or by remounting the gear when roughing and finishing on different machines.

It is, of course, to be understood, that the present invention is, by no means, limited to the particular methods described hereinbefore but also comprises any modifications within the scope of the appended claims. The present invention also comprises a cutter head for carrying out the method according to the present invention.

What I claim is:

1. A method of separately roughing and finishing bevel gears with cycloidal tooth traces by means of one and the same cutter head comprising roughing blade means and finishing blade means, which includes the steps of: adjusting said roughing and finishing blade means and the work piece into which the teeth are to be cut relative to each other for the roughing cut so that said roughing blade means only will cut the work piece and rotating the workpiece and cutter head, and subsequently adjusting said roughing and finishing blade means relative to each other and adjusting said work piece angularly relative to said cutter head so that said finishing blade means only will cut the workpiece and rotating the workpiece and cutter head.

2. A method of separately roughing and finishing bevel gears with cycloidal tooth traces by means of one and the same cutter head comprising roughing blade means and finishing blade means, which includes the steps of: arranging the roughing and finishing blade means in successive and angularly spaced arrangements and on sweep radii in such a way that in cutting position of said roughing blade means the finishing blade means will not be in cutting position, rotating the workpiece and cutter head to rough out the teeth, reducing the angular spacing of said finishing blade means from the respective preceding roughing blade means when looking in cutting direction of the cutter head while changing the relative angular position of the work piece with regard to the cutter head whereby said finishing blade means are moved into cutting position and said roughing blade means become ineffective with regard to carrying out a cut, and continuing rotation of said workpiece and cutter head to finish the teeth.

3. A method of separately roughing and finishing bevel gears with cycloidal tooth traces by means of one and the same cutter head comprising outside and inside cutting roughing blade means and also outside and inside cutting finishing blade means, which includes the steps of: mounting the roughing and finishing blade means in successive angularly spaced arrangement and on sweep radii in such a way that in cutting position of said roughing blade means the finishing blade means will not be in cutting position, rotating the workpiece and cutter head to rough out the teeth, increasing the sweep radii of the outside cutting finishing blade means and of the inside cutting roughing blade means while changing the relative angular position of the work piece with regard to the cutter head whereby said finishing blade means are moved into cutting position and said roughing blade means become ineffective with regard to carrying out a cut, and continuing rotation of the workpiece and cutter head to finish the teeth.

4. A method of separately roughing and finishing bevel gears with cycloidal tooth traces by means of one and the same cutter head comprising outside and inside cutting roughing blade means and also outside and inside cutting finishing blade means, which includes the steps of: mounting the roughing and finishing blade means in successive angularly spaced arrangement and on sweep radii in such a way that in cutting position of said roughing blade means the finishing blade means will not be in cutting position, rotating the workpiece and cutter head to rought out the teeth decreasing the sweep radii of the inside cutting finishing blade means and the outside cutting roughing blade means while changing the relative angular position of the workpiece with regard to the cutter head whereby said finishing blade means are moved into cutting position and said roughing blade means become ineffective with regard to carrying out a cut, and continuing rotation of the workpiece and cutter head to finish the teeth.

5. A method of separately roughing and finishing bevel gears with cycloidal tooth traces by means of a two-part cutter head comprising outside and inside cutting roughing blade means and also outside and inside cutting finishing blade means, which includes the steps of: adjusting said roughing and finishing blade means and the workpiece into which the teeth are to be cut relative to each other for the roughing cut so that said roughing blade means only will cut the workpiece, rotating the workpiece and cutter head to rough out the teeth, subsequently varying the eccentricity of the outside cutting finishing blade means and the inside cutting roughing blade means while changing the relative angular position of the workpiece with regard to the cutter head whereby said finishing blade means are moved into cutting position and said roughing blade means become ineffective with regard to carrying out a cut, and continuing rotation of the workpiece and cutter head to finish the teeth.

6. A method of separately roughing and finishing bevel gears with cycloidal tooth traces by means of a two-part cutter head comprising outside and inside cutting roughing blade means and also outside and inside cutting finishing blade means, which includes the steps of: adjusting said roughing and finishing blade means and the workpiece into which the teeth are to be cut relative to each other for the roughing cut so that said roughing blade means only will cut the workpiece, rotating the workpiece and cutter head to rough out the teeth, subsequently varying the eccentricity of the inside cutting finishing blade means and the outside cutting roughing blade means while changing the relative angular position of the workpiece with regard to the cutter head whereby said finishing blade means are moved into cutting position and said roughing blade means become ineffective with regard to carrying out a cut and continuing rotation of the workpiece and cutter head to finish the teeth.

7. A cutter head for forming bevel gears by a first roughing operation and a final finish operation comprising; a stationary frame, a head rotatable in the frame and comprising a first plate having cutter elements thereon in circumferentially spaced relation and rotatable on a fixed axis, said head comprising a second plate also having cutter elements thereon in circumferentially spaced relation and sweeping about the same region as the teeth on the first plate, means connecting the plates for rotation in unison, and control means for adjusting said second plate bodily in radial direction thereof in the frame to control the eccentricity of the second plate relative to the first plate.

8. A cutter head according to claim 7 in which said control means comprises a carrier in which said second plate is rotatably supported, fluid operable connected between the frame and the carrier for moving the carrier and second plate in the frame, and guide means guiding the carrier in straight line movement in the frame.

9. A cutter head according to claim 8 in which means are provided for clamping the carrier to the frame in adjusted positions therein.

References Cited by the Examiner
UNITED STATES PATENTS

| | | |
|---|---|---|
| 1,274,466 | 8/1918 | Stewart et al. |
| 1,825,733 | 10/1931 | Johanson _____ 29—105 X |
| 1,964,799 | 7/1934 | Hill et al. _____ 90—5 |
| 2,881,665 | 4/1959 | Krumme _____ 90—5 |

OTHER REFERENCES

| | | |
|---|---|---|
| 529,584 | 7/1931 | Germany. |
| 902,282 | 8/1962 | Great Britain. |

WILLIAM W. DYER, Jr., *Primary Examiner.*

ANDREW R. JUHASZ, LEON PEAR, *Examiners.*